US010176695B2

(12) United States Patent
Liu et al.

(10) Patent No.: US 10,176,695 B2
(45) Date of Patent: Jan. 8, 2019

(54) REAL-TIME WATER SAFETY ANALYSIS BASED ON COLOR-MOVEMENT TRACKING

(71) Applicant: International Business Machines Corporation, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/284,139

(22) Filed: Oct. 3, 2016

(65) Prior Publication Data

US 2018/0096580 A1   Apr. 5, 2018

(51) Int. Cl.
  *G08B 21/08* (2006.01)
  *G06T 7/20* (2017.01)

(52) U.S. Cl.
  CPC ............ *G08B 21/08* (2013.01); *G06T 7/2033* (2013.01); *G06T 2207/10024* (2013.01)

(58) Field of Classification Search
  CPC .................. G08B 21/08; G08B 21/082; G06T 2207/10012; G06T 2207/30196; G06T 7/0002
  See application file for complete search history.

(56) References Cited

U.S. PATENT DOCUMENTS 7,330,123 B1 * 2/2008 Grahn .................. G08B 21/082
                                                      340/553

FOREIGN PATENT DOCUMENTS

CN        101650870        6/2011
CN        102542301        7/2012

* cited by examiner

*Primary Examiner* — Kabir A Timory
(74) *Attorney, Agent, or Firm* — DeLizio Law, PLLC

(57) ABSTRACT

Some embodiments include a method for identifying, by an electronic water safety system, distressed swimmers in a body of water. The method can include capturing, by a video capture device, video frames of the body of water. The method can include identifying, by the video capture device, a color-code in the video frames. The method can include determining, by the video capture device, a location of the color-code in each of the video frames. The method can include determining, by a movement controller, movement of the color-code in the video frames based on the location of the color-code in each of the video frames. The method can include determining that the swimmer is in distress based on the movement of the color-code in the video frames. The method can include alerting, by an alert controller, water safety personnel about the swimmer in distress.

20 Claims, 7 Drawing Sheets

REAL-TIME WATER SAFETY ANALYSIS BASED ON COLOR-MOVEMENT TRACKING

BACKGROUND

Drowning is a relatively common cause of accidental death. In relatively small water settings with limited numbers of people, water safety can be manageable. However, even in small water settings, distressed swimmers can go unnoticed by water safety personnel. As water settings grow, water safety may become more difficult, leading to more risk for swimmers.

SUMMARY

Some embodiments include a method for identifying, by an electronic water safety system, distressed swimmers in a body of water. The method can include capturing, by a video capture device, video frames of the body of water. The method can include identifying, by the video capture device, a color-code in the video frames. The method can include determining, by the video capture device, a location of the color-code in each of the video frames. The method can include determining, by a movement controller, movement of the color-code in the video frames based on the location of the color-code in each of the video frames. The method can include determining that the swimmer is in distress based on the movement of the color-code in the video frames. The method can include alerting, by an alert controller, water safety personnel about the swimmer in distress.

The method can include presenting, on a display monitor, a graphical marker indicating the distressed swimmer in the body of water.

The method can include presenting, on a display monitor, the video frames in a real-time video stream, and presenting, on the display monitor, a graphical marker indicating the distressed swimmer, wherein the video marker appears in the real-time video stream.

In some embodiments, the color-code is included on a swim cap worn by the distressed swimmer.

In some embodiments, the color-code includes two colors selected from a group of three or more colors.

In some embodiments, the determining that the swimmer is in distress based on the movement of the color-code in the video frames further includes processing the movement of the color-code and movement rules to determine that the movement of the color-code indicates that the swimmer is in distress.

In some embodiments, the movement rules check the movement of the color-code for up-and-down movements.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In some instances, well-known instruction instances, protocols, structures and techniques have been omitted for purposes of clarity.

INTRODUCTION

Some embodiments of the inventive subject matter can detect one or more distressed swimmers, and summon rescuers for help. In some embodiments, a system includes components that detect color-code identifiers on swimmers, and monitor those identifiers for movement indicative of distress. If the system detects that a color-code identifier is exhibiting behavior indicative of distress, the system alerts rescuers (e.g., lifeguards) about the distressed swimmer.

Embodiments of the system avoid computationally intensive computer vision techniques that determine whether captured video frames depict humans, and human bodily movement. Instead, embodiments detect movements of color-code identifiers while ignoring bodily movements of those wearing the color-code identifiers. By monitoring movements of color-code identifiers, the system can achieve computational efficiency that enables scalability to relatively large numbers of swimmers in large water settings.

DESCRIPTION OF SOME EMBODIMENTS

Figure 1:
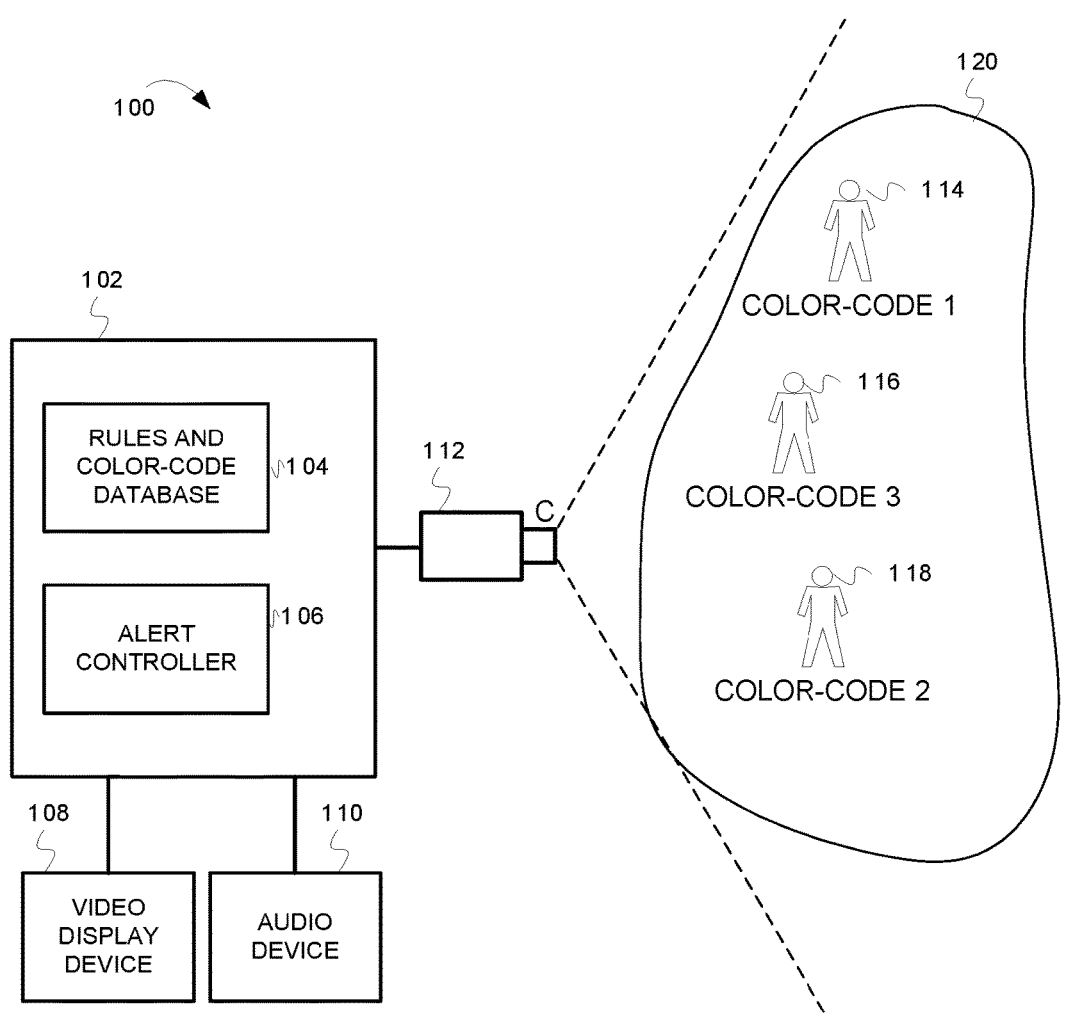
FIG. 1 is a block diagram illustrating a water safety system, with some embodiments of the inventive subject matter.

FIG. 1 is a block diagram illustrating a water safety system, according to some embodiments of the inventive subject matter. In FIG. 1, a water safety system 100 includes a water safety server 102. The water safety server 102 is connected to a video capture device 112, video display device 108, and audio device 110. FIG. 1 also shows swimmers 114, 116, and 118, in a body of water 120. The swimmers each have different color-code identifiers (also referred to as "color-codes") that uniquely identify them to the water safety system 100. In some embodiments, color-codes can include any suitable number of colors, where each color is defined by a particular saturation or hue. In FIG. 1, the swimmer 114 is wearing color-code 1, whereas the swimmer 116 is wearing color-code 3, and the swimmer 118 is wearing color-code 2. Color-codes will be described in more detail below (see discussion of FIG. 2).

In FIG. 1, the water safety system 100 includes rules and color-code database 104, alert controller 106, and movement controller 113. The rules and color-code database 104 store rules for identifying color-code movements associated with distressed swimmers, and color-codes for each swimmer registered with the system. Before entering the body of water 120, each swimmer's color-code is registered in the database 104.

During operation, the video capture device 112 captures video frames of the swimmers 114, 116, and 118 in the water 120. The video capture device 112 processes the captured video frames, and determines which registered color-codes appear in captured frames. In FIG. 1, the video capture device 112 captures video frames including color-codes 1, 2, and 3. In turn, the video capture device 112 identifies color-codes 1, 2, and 3, and determines movement of those color-codes over a given number of frames. The video capture device 112 provides, to the water safety server 102, information indicating the detected color-codes and corresponding movements. In turn, the water safety server's alert controller 106 processes the movement information according to a set of rules for identifying distressed swimmers. For example, if the movement information indicates that color-code 1 rapidly moved up-and-down for a few seconds and then disappeared (e.g., under the water), the alert controller 106 may transmit alert messages to the video display device 108 and audio device 110. Water safety personnel can see and hear alerts presented on the video display device 108 and audio device 110, and take appropriate action to assist swimmers.

In some embodiments, rules (in the database 104) can be represented as conditional statements relating to movement of the color-codes. For example, the rules may specify certain changes in the color-code's X and Y coordinates over specified time intervals that correlate with behavior of distressed swimmers. If a rule is satisfied based on the movement information provided by the video capture device 112, the rule may cause analysis of one or more other rules. In other embodiments, the rules can be represented in any suitable manner that facilitates analysis of movement information determined by the movement controller 113.

Figure 2:
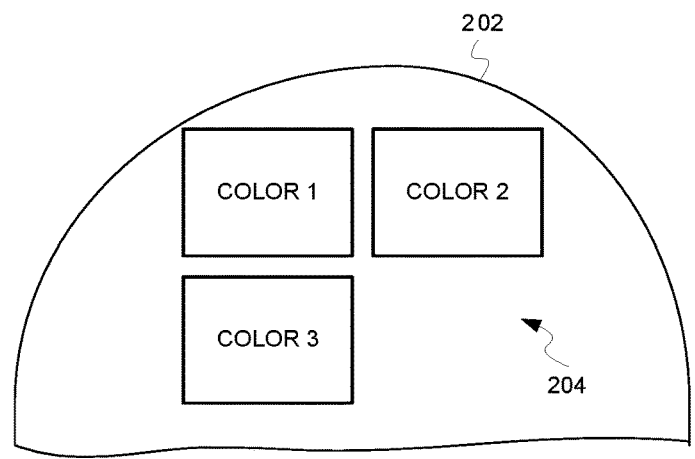
FIG. 2 is a diagrammatic illustration of a swim cap including a color-code, according to some embodiments.

This description continues with a discussion of color-codes, and how some embodiments utilize color-codes to detect potentially drowning swimmers. FIG. 2 is a diagrammatic illustration of a swim cap including a color-code, according to some embodiments. In FIG. 2, a swim cap 202 includes a color-code 204. Each swimmer wears a swim cap. Some embodiments place color-codes on swim caps because swim caps often remain above the water, in positions where the color codes are perceptible to video capture devices. The color code 204 includes three colors—color 1, color 2, color 3. In some embodiments, each of the colors is defined by a saturation or hue. Any suitable number of colors may be used, so long as each color has unique saturation or hue perceptible by a suitable video capture device. Embodiments can track $M^3$ swimmers by using M unique colors, where each color-code includes three of the M unique colors. For example, a system can track 343 swimmers by using color-codes having three colors, where each of the three colors is selected from a set of seven unique colors. Embodiments can utilize any suitable number of unique colors, and any suitable number of colors in each color-code.

In some embodiments, color-codes may be included in temporary body tattoos, wristbands, headbands, or other devices. In some instances, a swimmer may exhibit a color-code multiple ways, such as on a swim cap, body tattoo, and wrist band.

Figure 3:
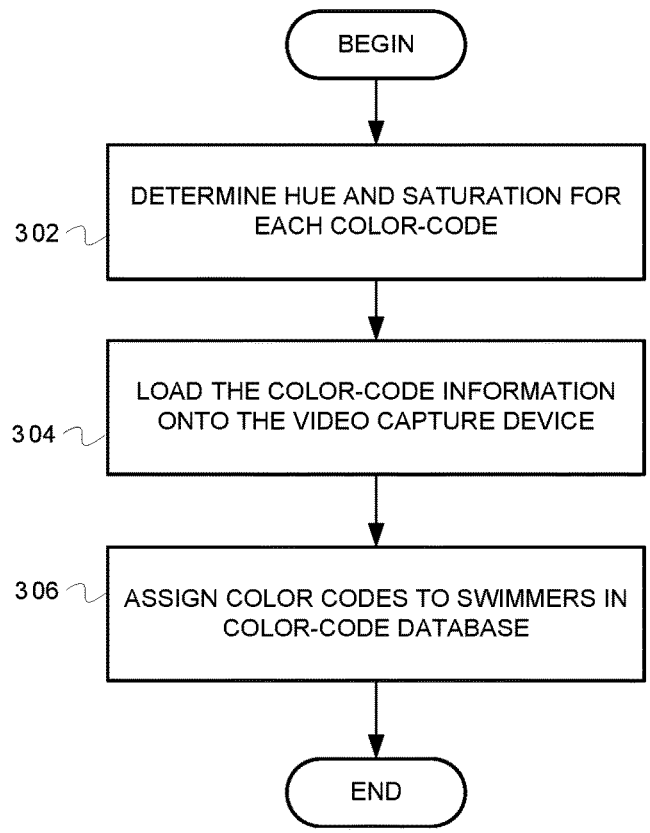
FIG. 3 is a flow diagram illustrating operations for initializing water safety system, according to some embodiments.

FIG. 3 is a flow diagram illustrating operations for initializing a water safety system, according to some embodiments. The flow 300 begins at block 302, where a water safety system determines a hue or saturation for each color-code. In some embodiments, a system operator may enter this information manually. Alternatively, the system may procure a file including the information, or it may acquire the information in any other suitable fashion. The water safety system can store the color information in a database (e.g., database 104). At block 304, the water safety system loads color-code information on to its video capture device. For example, the water safety server transmits, to its video capture device, information indicating a set of unique color-codes. The flow continues at block 306. At block 306, the water safety system assigns color-codes to swimmers. For example, the water safety system may associate swimmers with color-codes stored in the database 104. That is, unique color-codes may be associated with unique swimmers. After block 306, the flow ends.

After performing the operations shown in FIG. 3, the water safety system has been initialized, and is ready to monitor a body of water for distressed swimmers. In some embodiments, while the water safety system is monitoring a body of water, it can also assign color-codes to swimmers. That way, as new swimmers arrive, the system can associate them with color-codes, and begin monitoring for the newly-assigned color-codes. This description will now provide more detail about operations for monitoring a body of water.

Figure 4:
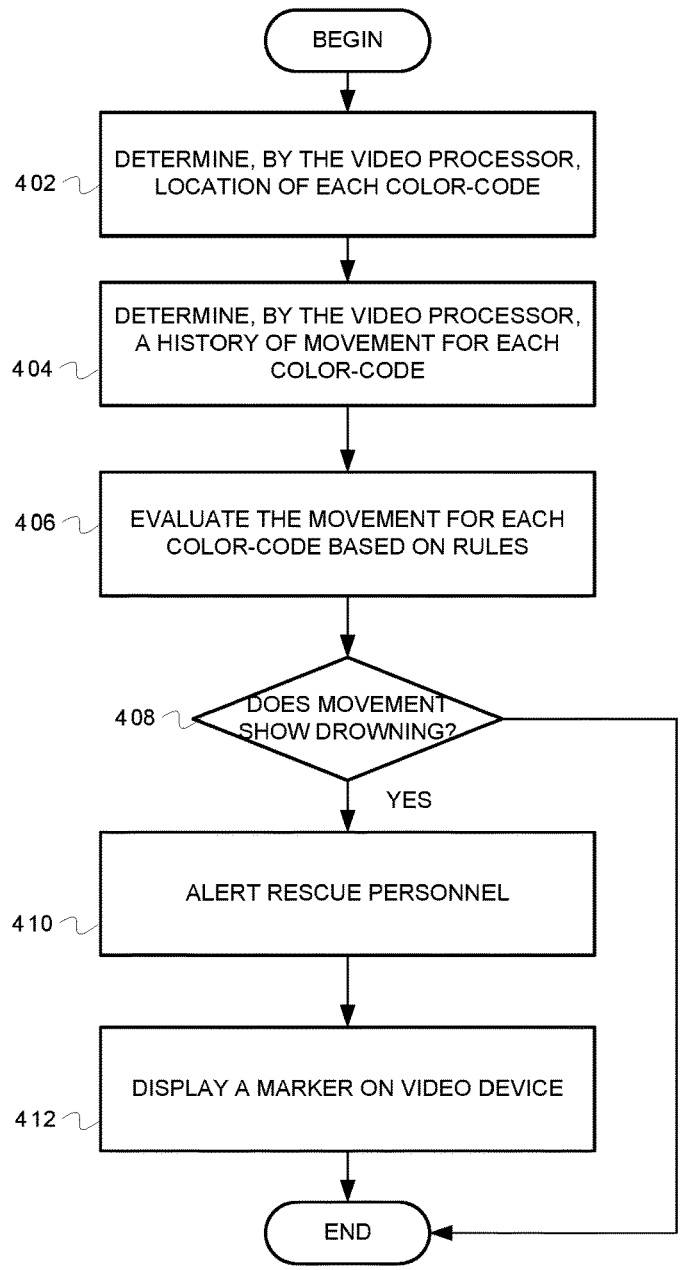
FIG. 4 is a flow diagram illustrating operations for monitoring a body of water, according to some embodiments.

FIG. 4 is a flow diagram illustrating operations for monitoring a body of water, according to some embodiments. In some embodiments, the operations of FIG. 4 are performed by the water safety system shown in FIG. 1. The operations of FIG. 4 begin at block 402. At block 402, the water safety system's video capture device captures one or more video frames, and determines a location of each color-code in the video frames. The video capture device can use computer vision techniques to determine video frame locations (e.g., X and Y coordinates in a video frame) for each color-code appearing in the video frame. In some embodiments, the video capture device may also determine an angle from horizontal for each color-code. The flow continues at block 404.

At block 404, the water safety system determines movement of each color-code. For a particular color code, movement can be indicated by a plurality of (X,Y) coordinates, where each (X,Y) represents a location in a given video frame. Changes in the color-code's (X,Y) indicate movement of the color-code. In some embodiments, the water safety system can also detect movement in the Z direction by evaluating whether the color-code is getting larger or smaller. As the color-code gets larger or smaller, it is moving toward or away from the video capture device, respectively. Additionally, the water safety system may determine a relative angle of each color-code, which indicates an angle of each swimmer's head. For example, in FIG. 2, the colors are represented by square blocks. The system can determine an orientation of the blocks, such as by determining an angle of a block's top edge relative to the water (or horizontal). The system may utilize any other suitable method for determining color-code movement and orientation. The system can record movement in a database (e.g., database 104). The flow continues at block 406.

At block 406, the water safety system evaluates the movement for each color-code based on rules for identifying distressed swimmers. In some embodiments, the system's movement controller uses movement rules (stored in the database 104) to determine whether a color-code's movement history is exhibiting drowning behavior. For example, a rule may specify that a color-code moving in rapid up-and-down fashion is exhibiting drowning behavior. The movement controller can recognize rapid-and-down movement by examining changes to a color-code's Y coordinate in successive video frames. Embodiments can apply multiple rules for movements associated with a given set of video frames. That is, the movement controller can evaluate a color-code's movement history for rapid up-and-down movements, and for other movements such as downward movements by which the color-code disappears from the frame for a given duration. The flow continues at block 408.

At block 408, the water safety system determines whether the color-code movement indicates a distressed swimmer. If the color-code movement indicates a distressed swimmer, the flow continues at block 410. Otherwise, the flow ends.

At block 410, the water safety system's alert controller alerts rescue personnel of a distressed swimmer in the body of water. In some embodiments, the alert controller can alert rescue personnel in any suitable fashion, such as sounding a siren, sending text messages to water safety personnel, flashing lights, etc. The flow continues at block 412.

Figure 5:
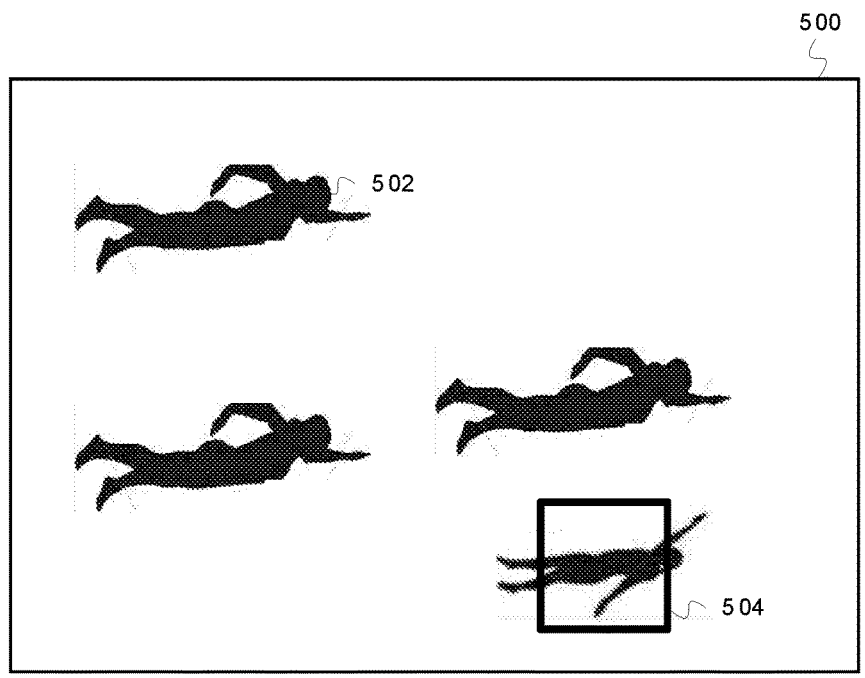
FIG. 5 is a diagrammatic representation illustrating a marker presented on a video monitor.

At block 412, the water safety system displays, on a video monitor, a marker indicating the location of the color-code associated with the distressed swimmer. FIG. 5 is a diagrammatic representation illustrating a marker presented on a video monitor. In FIG. 5, a video monitor 500 shows swimmers 502. Additionally, the video monitor 500 shows a video marker 504 indicating a location (in the video frame in real-time) of the color-code associated with a distressed swimmer. Water safety personnel can use the marker to assist in locating the associated swimmer in a body of water. From block 412, the flow ends.

Additional Embodiments

This description will continue with a discussion of additional embodiments of the water safety system.

Figure 6:
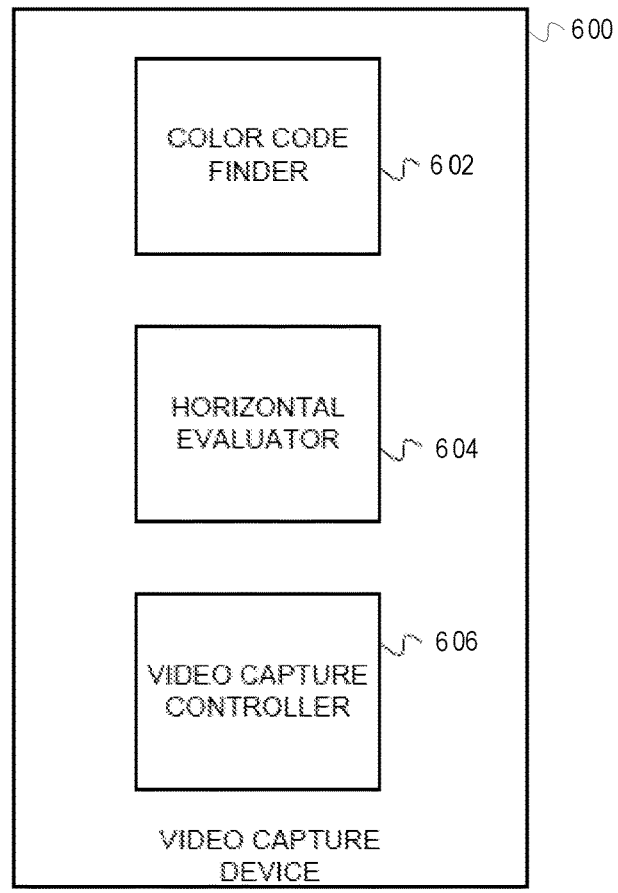
FIG. 6 is a block diagram illustrating components of a video capture device, with some embodiments of the inventive subject matter.

FIG. 6 is a block diagram illustrating components of a video capture device, according to some embodiments of the inventive subject matter. In FIG. 6, a video capture device 600 includes a color-code finder 602, horizontal evaluator 604, and video capture controller 606. The color-code finder 602 can find color-codes in captured video frames. In some embodiments, the color-code finder 602 uses computer vision techniques to locate color-codes in captured video frames. For example, the color-code finder 602 can search video frames for pixel combinations having particular hues, color saturations, or other color-specific information. In some embodiments, the color finder 602 can perform operations described in FIG. 4.

The horizontal evaluator 604 can determine an angle from horizontal for color-codes in a video frame. The video capture controller 606 controls capture of video frames. The video capture controller 606 can control various parameters including lens focus, frame rate, resolution, etc. The video capture controller 606 can perform operations described in FIG. 4.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
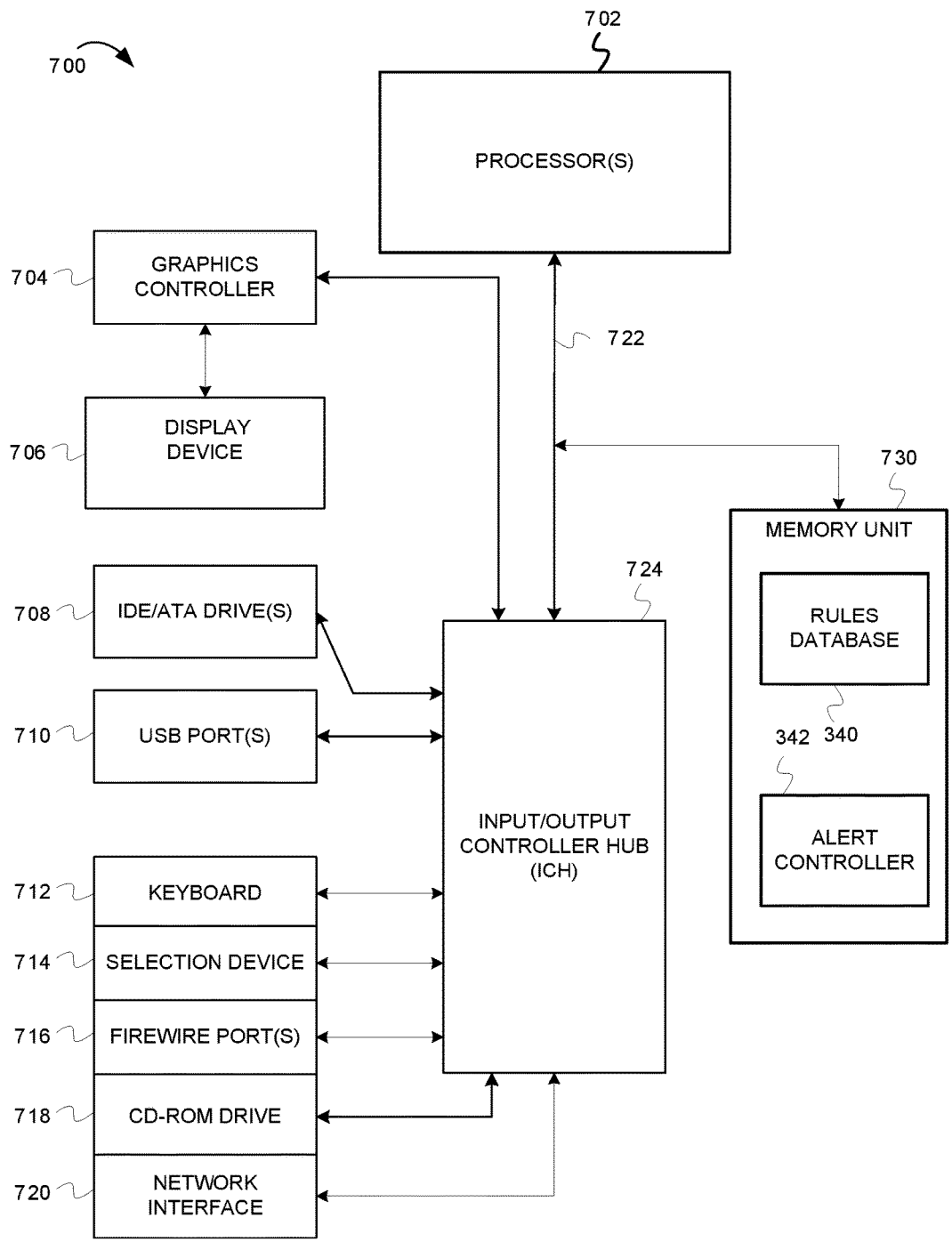
FIG. 7 is a block diagram illustrating a water safety server, according to some embodiments of the inventive subject matter.

FIG. 7 depicts an example computer system. A computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport®, InfiniBand®, NuBus, etc.), a network interface 705 (e.g., an ATM interface, an Ethernet interface, a Frame Relay interface, SONET interface, wireless interface, etc.), and a storage device(s) 709 (e.g., optical storage, magnetic storage, etc.). The system also includes an alert controller 712, rules and color-code database 711, and movement 713. In some embodiments, the alert controller 712, rules and color-code database 711, and movement controller 713 perform functions described in the flow diagrams.

The system memory 707 can embody functionality to implement embodiments described above. The system memory 707 may include one or more functionalities (e.g., computer-executable program code) that facilitate the operations described in the discussion of the flow diagrams. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 709, and the network interface 705 are coupled to the bus 703. Although illustrated as being coupled to the bus 703, the memory 707 may be coupled to the processor unit 701.

While the embodiments are described with reference to various implementations and exploitations, it will be understood that these embodiments are illustrative and that the scope of the inventive subject matter is not limited to them. In general, techniques for color-code analysis of video frames for water safety as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for identifying, by an electronic water safety system, a distressed swimmer in a body of water, the method comprising:
    capturing, by a video capture device, video frames including the body of water and the swimmer;
    determining, by the video capture device, presence of a color area on the swimmer in the video frames;
    determining, by the video capture device, a location of the color area on the swimmer in each of the video frames;
    determining, by a movement controller, movement of the color area on the swimmer in the video frames based on the location of the color area on the swimmer in each of the video frames;
    determining that the swimmer is in distress based on the movement of the color area on the swimmer in the video frames;
    alerting, by an alert controller, water safety personnel about the swimmer in distress.

2. The method of claim 1 further comprising:
    presenting, on a display monitor, a graphical marker indicating the distressed swimmer in the body of water.

3. The method of claim 1 further comprising:
    presenting, on a display monitor, the video frames in a real-time video stream;
    presenting, on the display monitor, a graphical marker indicating the distressed swimmer, wherein the graphical marker appears in the real-time video stream.

4. The method of claim 1 wherein the color area is included on a swim cap worn by the distressed swimmer.

5. The method of claim 1 wherein the color area includes two colors selected from a group of three or more colors.

6. The method of claim 1 wherein the determining that the swimmer is in distress based on the movement of the color area in the video frames further includes:
    processing the movement of the color area and movement rules to determine that the movement of the color area indicates that the swimmer is in distress.

7. The method of claim 6, wherein the movement rules check the movement of the color area for up-and-down movements.

8. One or more non-transitory computer readable storage mediums including computer executable instructions stored therein, the computer executable instructions configured to, when executed on one or more processors, perform operations for identifying, by an electronic water safety system, distressed swimmers in a body of water, the computer executable instructions comprising:
    instructions to capture, by a video capture device, video frames of the body of water;

instructions to determine, by the video capture device, presence of a color-code on a swimmer in the captured video frames;

instructions to determine, by the video capture device, a location and orientation of the color-code on the swimmer in each of the captured video frames;

instructions to determine, by a movement controller, movement of the color-code on the swimmer in the captured video frames based on the location of the color-code in each of the video frames;

instructions to determine that the swimmer is in distress based on the movement of the color-code in the captured video frames;

instructions to alert, by an alert controller, water safety personnel about the swimmer in distress.

9. The one or more non-transitory computer readable storage mediums of claim 8, wherein the computer executable instructions further comprise:

instructions to present, on a display monitor, a graphical marker indicating the distressed swimmer in the body of water.

10. The one or more non-transitory computer readable storage mediums of claim 8, wherein the computer executable instructions further comprise:

instructions to present, on a display monitor, the video frames in a real-time video stream; and instructions to present, on the display monitor, a graphical marker indicating the distressed swimmer, wherein the graphical marker appears in the real-time video stream.

11. The one or more non-transitory computer readable storage mediums of claim 8 wherein the color-code is included on a swim cap worn by the distressed swimmer.

12. The one or more non-transitory computer readable storage mediums of claim 8 wherein the color-code includes two colors selected from a group of three or more colors.

13. The one or more non-transitory computer readable storage mediums of claim 8 wherein the instructions to determine that the swimmer is in distress based on the movement of the color-code in the video frames further include:

instructions to process the movement of the color-code and movement rules to determine that the movement of the color-code indicates that the swimmer is in distress.

14. The one or more non-transitory computer readable storage mediums of claim 13, wherein the movement rules check the movement of the color-code for up-and-down movements.

15. An apparatus comprising:
at least one processor;
one or more non-transitory computer readable storage mediums including computer executable instructions stored therein, the computer executable instructions configured to, when executed by the at least one processor, perform operations for identifying, by an electronic water safety system, distressed swimmers in a body of water, the computer executable instructions comprising instructions to capture, by a video capture device, video frames of a swimmer and the body of water;

instructions to determine, by the video capture device, presence of a color-code on the swimmer in the video frames;

instructions to determine, by the video capture device, a location and orientation of the color-code on the swimmer in each of the video frames;

instructions to determine, by a movement controller, movement of the color-code in the video frames based on the location of the color-code on the swimmer in each of the video frames;

instructions to determine that the swimmer is in distress based on the movement of the color-code in the video frames;

instructions to alert, by an alert controller, water safety personnel about the swimmer in distress.

16. The apparatus of claim 15 further comprising:
presenting, on a display monitor, a graphical marker indicating the distressed swimmer in the body of water.

17. The apparatus of claim 15 further comprising:
instructions to present, on a display monitor, the video frames in a real-time video stream;

instructions to present, on the display monitor, a graphical marker indicating the distressed swimmer, wherein the graphical marker appears in the real-time video stream.

18. The apparatus of claim 15 wherein the color-code is included on a swim cap worn by the distressed swimmer.

19. The apparatus of claim 15 wherein the color-code includes two colors selected from a group of three or more colors.

20. The apparatus of claim 15 wherein the instructions to determine that the swimmer is in distress based on the movement of the color-code in the video frames further include:

instructions to process the movement of the color-code and movement rules to determine that the movement of the color-code indicates that the swimmer is in distress.

* * * * *